No. 641,052. Patented Jan. 9, 1900.
E. STRAUSS.
HOME MILK MODIFIER.
(Application filed Nov. 29, 1898.)
(No Model.)
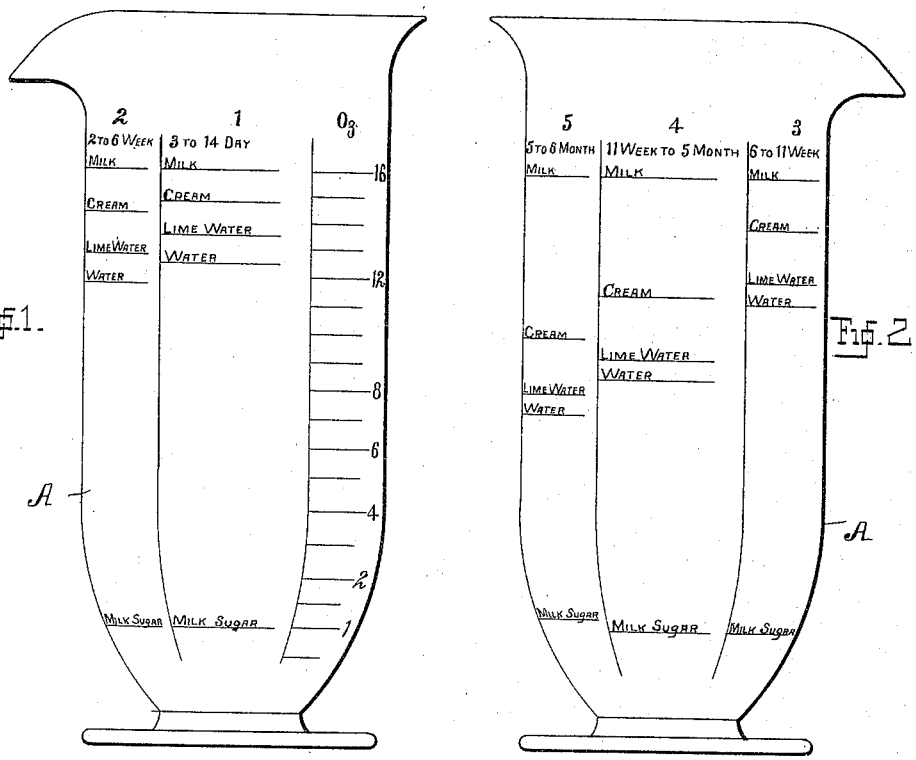
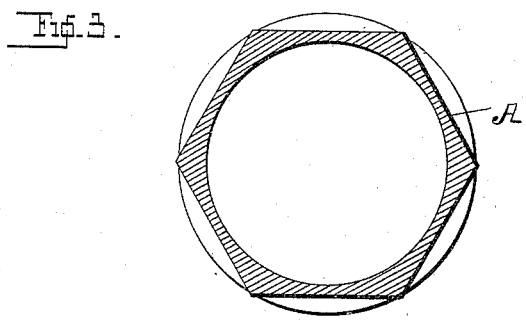
WITNESSES
Wm A. Courtland
M. V. Bidgood
INVENTOR
Ernest Strauss
BY
Strauss & Bros
ATTORNEYS

UNITED STATES PATENT OFFICE.

ERNEST STRAUSS, OF NEW YORK, N. Y., ASSIGNOR OF ONE-HALF TO ALBERT HAAS, OF SAME PLACE.

HOME MILK-MODIFIER.

SPECIFICATION forming part of Letters Patent No. 641,052, dated January 9, 1900.

Application filed November 29, 1898. Serial No. 697,737. (No model.)

*To all whom it may concern:*

Be it known that I, ERNEST STRAUSS, a citizen of the United States, residing at New York, in the county and State of New York, have invented certain new and useful Improvements in Home Milk-Modifiers, of which the following is a specification.

This invention relates to a home milk-modifier, the object of the same being to enable the modification of cows' milk so as to imitate closely the composition of mothers' milk at different periods, and thus produce different milk composition suited to different stages of the child's growth, and the device being of such a nature as not to require any special skill or training for its application and being therefore adapted for home use. For this purpose I provide a graduate or measuring vessel having a plurality of formulas or schedules arranged thereon, giving the heights to which the vessel must be filled in successively adding the various ingredients to produce the different compositions desired.

The accompanying drawings show a graduate or measuring vessel embodying my invention.

Figures 1 and 2 are elevations of same from opposite sides, and Fig. 3 is a horizontal section of the same.

The measuring vessel A is made on the general style of a sixteen-ounce glass graduate; but to facilitate the application and inspection of the several formulas or schedules thereon it may be and preferably is formed with a plurality of flat sides. I have shown it as having six sides, on one of which (headed "Oz.") may be marked the usual ounce divisions or level-marks of a volumetric scale, while on the other sides (headed by the numerals "1," "2," "3," "4," "5") are marked, in a separate series on each side, the lines and accompanying word-marks to indicate the level to which the vessel must be filled when supplying the ingredient indicated by said word-mark, it being understood that these ingredients are supplied in the order in which the word-marks are placed, starting from the bottom. At the head of each side or column "1," "2," "3," "4," "5" may be marked also a statement of the period or age to which the schedule or formula on that side is appropriate, as indicated in Figs. 1 and 2. These schedules or formulas may be arranged on the basis of the prescription of Dr. L. E. Holt, as given in his book on the *Care and Feeding of Children*, as will be seen on comparing same with the ounce-scale, and by using this apparatus the composition of the milk-food is adjusted accurately in accordance with such prescription, so as to gradually vary the proportions of the ingredients according to the several formulas, or the formulas may be varied to accord with other systems.

It having been decided according to the child's age which formula is to be used, the panel presenting that formula is the only one to be observed, and the vessel is to be filled according to the following directions:

First. Milk-sugar. Introduce into the vessel milk-sugar to the line thus marked.

Second. Water. Add boiling water to the water-mark. Stir with glass rod until sugar is dissolved. If any particles are to be seen floating in the solution, it should be filtered either through absorbent cotton or a piece of clean muslin.

Third. Lime-water. Ordinary lime-water as bought in the drug-store should then be filled to the lime-water mark. (This is to overcome the acidity.)

Fourth. Cream. This should be taken from cream layer (top layer) of bottle-milk as commonly delivered by the dairymen and should be filled to the cream-mark.

Fifth. Milk. This should be taken from the same bottle after the cream has been poured off and should not be milk which has been shaken up with cream. Fill up to the milk-mark.

Sixth. Stir the entire mixture with a glass rod.

Seventh. The whole should then be sterilized in the ordinary way, poured into the feeding-bottles, and preserved on ice.

Having thus described my invention, what I claim as new therein, and desire to secure by Letters Patent, is—

1. A measuring vessel for compounding mixtures adapted to successively-changing conditions, said vessel being provided with a plurality of columns of graduations, each column being graduated to define the proportions corresponding to one of said conditions, substantially as set forth.

2. A measuring vessel provided with marks indicating successively-changing conditions and further provided with varying columns of graduations arranged to harmonize with the marks indicating the changing conditions whereby a mixture may be compounded in the vessel under any of the said conditions by observing the column of graduations corresponding to that condition, substantially as set forth.

ERNEST STRAUSS.

Witnesses:
HARRY E. KNIGHT,
M. V. BIDGOOD.